April 1, 1930.  J. A. PARDINI ET AL  1,752,650
DEMOUNTABLE EGG BEATER
Filed June 15, 1927
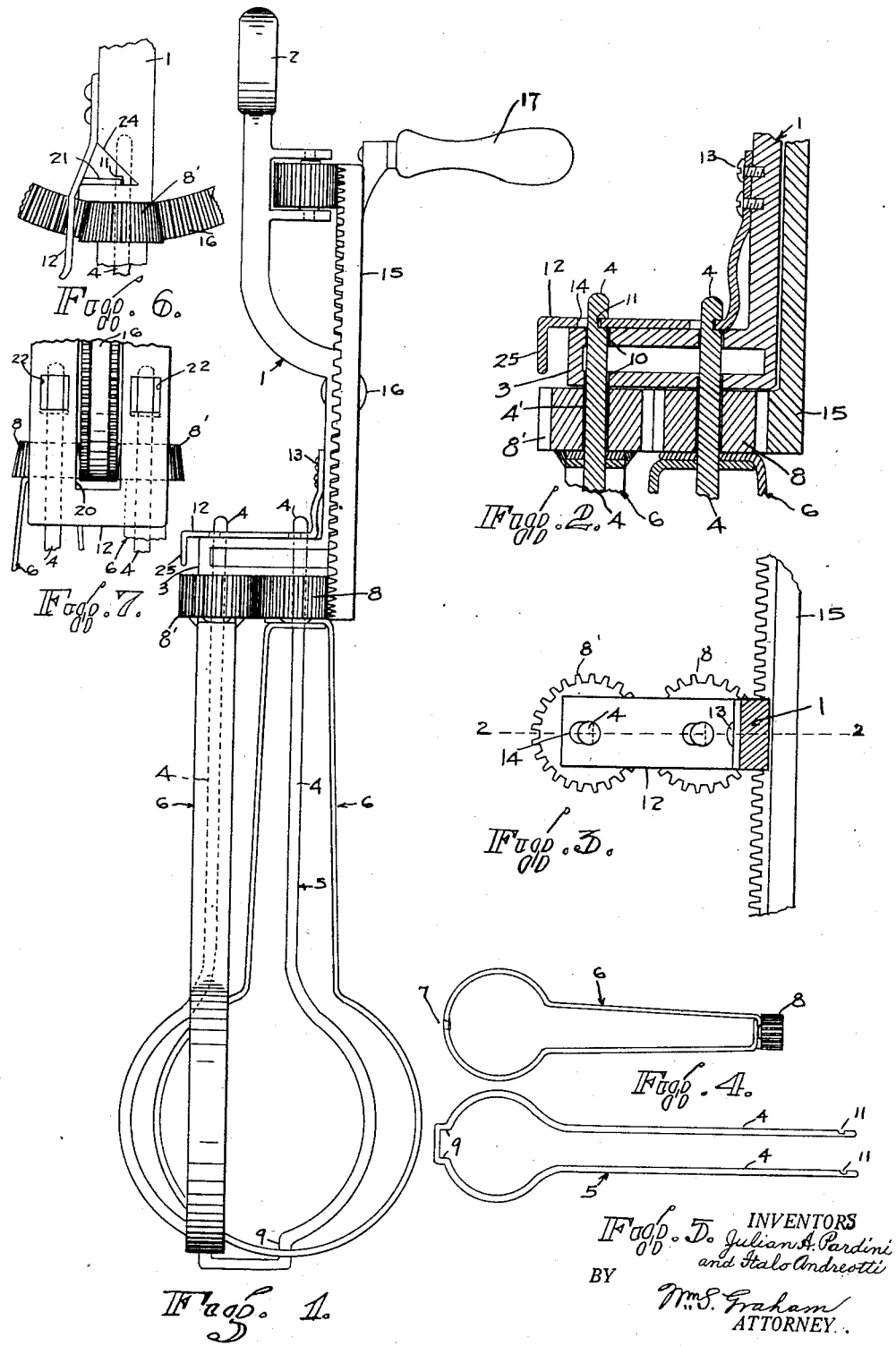
INVENTORS
Julian A. Pardini
and Italo Andreotti
BY
Wm S. Graham
ATTORNEY Patented Apr. 1, 1930

1,752,650

UNITED STATES PATENT OFFICE

JULIAN A. PARDINI, OF SAN FRANCISCO, AND ITALO ANDREOTTI, OF NEVADA CITY, CALIFORNIA

DEMOUNTABLE EGG BEATER

Application filed June 15, 1927. Serial No. 198,941.

This invention relates to beaters or mixers which are commonly known as egg beaters. The principal object is to provide an egg beater that is quickly and easily taken apart for cleaning, packing, and replacement of parts, and which can be manufactured economically.

It is common knowledge to users of egg beaters that because of the interwoven construction of the rotating members, such beaters are hard to clean, and that it is almost impossible to keep sanitary the lower pivot points of support as well as the beating blades and gears. To overcome this objection we have designed an egg beater that can be disassembled quickly and easily in such a manner that the rotating members themselves can be separated from the supporting member and handled individually. This materially aids in cleaning and also furnishes a beater that can be instantly knocked-down for shipping, or placing flat in a kitchen drawer, and also provides a beater, the parts of which are capable of separate replacement when broken or worn.

With the above mentioned and other objects in view, the invention consists in the novel construction hereinafter described, illustrated in the accompanying drawings, and set forth in the claims hereto appended, it being understood that various changes in form, proportion, size and minor details of construction within the scope of the claims may be resorted to without departing from the spirit, or sacrificing any of the advantages of the invention.

Referring to the drawing:—

Fig. 1 is an elevation of one side of an egg beater showing my improvement.

Fig. 2 is a section on line 2—2 of Fig. 3.

Fig. 3 is an enlarged fragmentary top plan view.

Fig. 4 shows a rotatable beating member, as it is separated from the structure.

Fig. 5 shows the supporting structure for the rotatable beating members.

Fig. 6 is a fragmentary side view of a modified form.

Fig. 7 is a fragmentary front view of the same modification.

The beater as shown in Fig. 1 comprises a main body portion or frame generally designated 1, one end terminating in a handle 2, the opposite end having an offset portion 3, adapted to receive the ends of the legs 4, of a substantially U-shaped supporting member generally designated 5.

Mounted on each leg 4 is a rotatable beater member generally designated 6, which member is provided with a hole 7 at the lower end thereof, through which the leg 4 is threaded. The opposite end of beater member 6, is equipped with a rigidly attached gear 8, which gear is provided with a hole to rotatably receive the leg 4, as shown at 4'.

After the rotating members 6, have been placed in proper positions on the supporting members 4, which entails bringing them down until the holes 7, pivot upon the small straight shanks shown at 9, the beating portion of the apparatus is then ready to join the actuating portion. To accomplish this the ends of the legs 4, are threaded through holes 10, provided in said offset portion 3, and the supporting member 5, is drawn up until the notches 11, are engaged by the spring 12, which spring is resiliently mounted as at 13, on the body portion 1 and provided with apertures 14, adapted to receive the legs 4. It is thus seen that when the notches 11 coincide with the spring 12, the spring snaps home and the legs are securely locked into position.

This same operation serves to mesh the gears 8, and 8' and also to mesh the large drive gear 15 with gear 8, said gear 15 being rotatably mounted on frame 1, as shown at 16, and provided with a handle 17, suitable for manually operating.

Figs. 6 and 7 show a modification in which the main drive gear 16 is placed between the two small gears 8 and 8' and the spring member 12 is bifurcated as at 20, to permit the gear 16 to pass through. Small portions 21, herein called tongues, are struck out of the body of the spring on three sides of tongue, the fourth side of the tongue remaining integral with the spring, as shown at 22, the portions thus struck out being bent down angularly to the spring member to serve as tongues to engage the notches 11 in the legs 4, of the supporting member 5. The frame member 1, is provided with a notch 24 to permit the tongues 21 to engage said leg 4, and also equipped with a hole suitable to receive said legs 4.

The operation of my device is the same in all cases as the regular egg beater, the only difference being that, after using and when desiring to clean the utensil, the spring 12, is pushed inwardly by pressing the tip of a finger against the depending portion 25. This permits the legs 4, to drop out and the beater mechanism is separated from the actuating means.

For further cleaning and laying away in a shallow drawer, the rotating members 6, are slid off the supporting member 5, and washed individually, when they may be laid flat in a drawer or shelf. It is obvious that this demountability also provides a means whereby the device may be shipped in knockdown form, and that any separate parts may be replaced without replacement of the beater in its entirety.

It is further manifest that in the modification shown in Figs. 6 and 7, the beating members 6, may be detached from the frame 1, by pressing the bifurcated spring member 12, outwardly and away from the main body portion, whereupon the legs 4, will drop out in the same manner as above described.

Whereas, for purposes of illustrative description, we have described the invention with reference to egg beaters, the structure may be used with any kind of a beater, or churner, as for example, for whipping cream, salad dressing or cake mixtures.

We claim:

1. In a beater comprising a main body portion, a rotatable beater mechanism, means consisting of a spring actuated latch for detachably connecting said body portion with said beater mechanism, and means in geared co-operation with the beater mechanism mounted on said body portion whereby said beater mechanism may be operated.

2. In a beater comprising a main body portion, a rotatable beater mechanism, said beater mechanism consisting of a pair of beating members each rotatably and removably mounted on a leg of a substantially U-shaped supporting frame, spring actuated means for demountably connecting said U-shaped frame to the main body portion, and means mounted on said body portion for operably engaging other means mounted on said beating members to rotate said beating members.

3. In a beater comprising a main body portion, a rotatable beater mechanism, said beater mechanism consisting of a pair of beating members each rotatably mounted on a leg of a substantially U-shaped supporting frame, means for detachably connecting said U-shaped frame to the main body portion, said means consisting of a spring clip resiliently mounted on said body portion, which body portion and spring are each provided with holes adapted to receive the ends of the legs of said U-shaped member, said legs being provided with notches adapted to lockingly engage one side of the holes in said spring, means whereby said spring may be released, and operating means mounted on said body portion, which means engages other means mounted on said beating mechanism.

4. A beater of the character described, comprising a main body portion having in the lower portion thereof vertically disposed openings, a beater support having spaced-apart legs notched at their upper ends and adapted snugly and removably to fit into said vertically disposed openings in the main body portion so that said legs are firmly supported against lateral movement in said openings, beater members rotatably mounted in spaced relationship on said legs, means adapted to lockingly engage the notches in the legs of the supports for the beating members so as to releasably hold same against vertical movement, and means whereby said beater members may be rotated.

5. A beater of the character described, comprising a frame, a beater member releasably mounted in connection with said frame, means whereby said beater member may be operated as a beater, means to support said beater member against movement with relation to the frame when connected thereto, means automatically operable for lockingly connecting the beater member to the frame and manually operable at will to release said connection.

6. A beater of the character described, comprising a frame, a beater-supporting member releasably mounted in connection with said frame, a beater member mounted on said supporting member, means whereby said beater member may be operated as a beater, means to support said beater-support against movement with relation to the frame when connected thereto, and means automatically operable for lockingly connecting the beater support member to the frame and manually operable at will to release said connection.

JULIAN A. PARDINI.
ITALO ANDREOTTI.